Patented Oct. 29, 1929

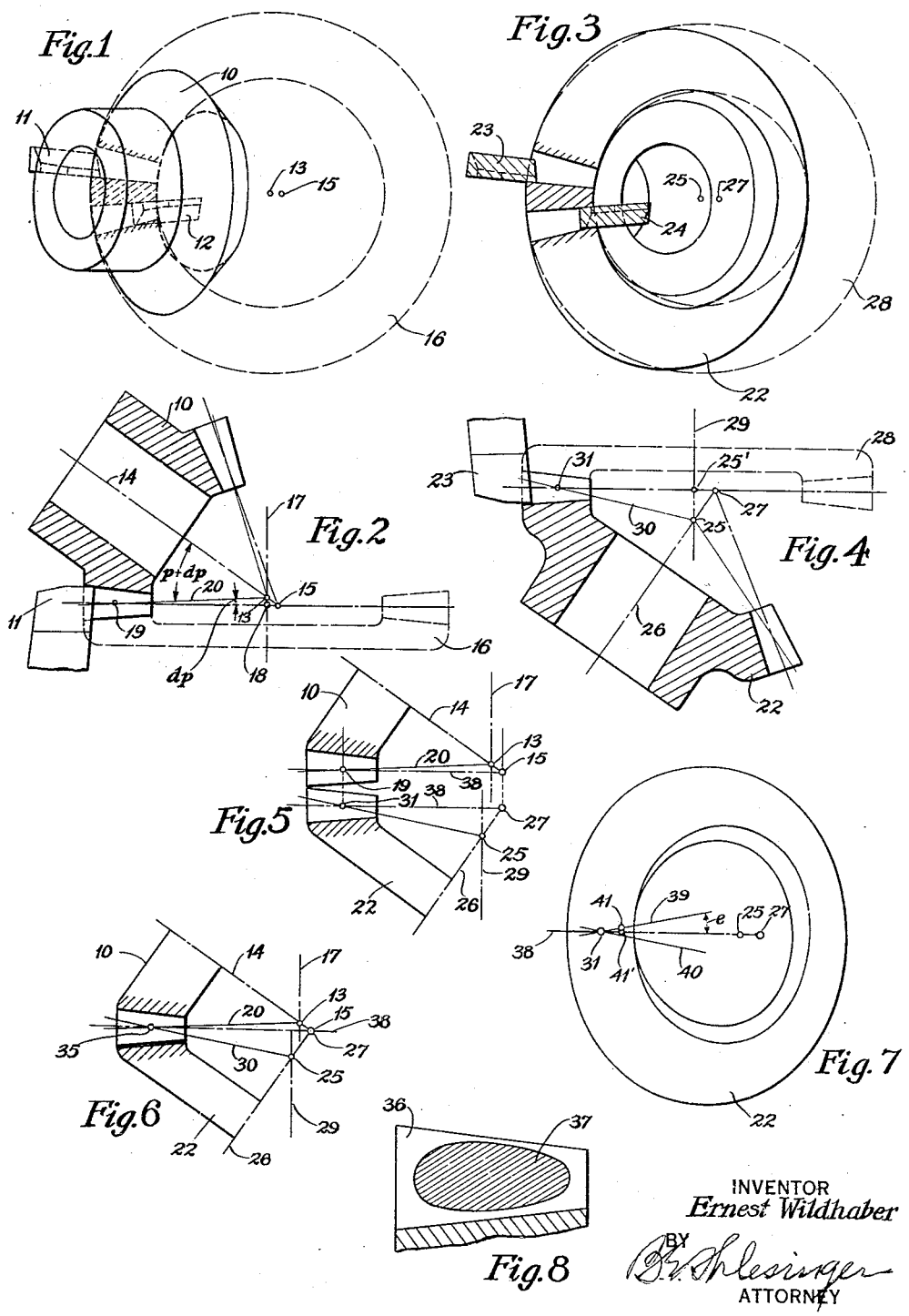

1,733,326

UNITED STATES PATENT OFFICE

ERNEST WILDHABER, OF ROCHESTER, NEW YORK, ASSIGNOR TO GLEASON WORKS, OF ROCHESTER, NEW YORK, A CORPORATION OF NEW YORK

METHOD OF PRODUCING BEVEL GEARS

Application filed December 31, 1926. Serial No. 158,330.

The present invention relates to gears and to a method of producing the same and particularly to straight tooth bevel gears and their manufacture.

It is a characteristic feature of straight tooth bevel gears that they possess very little adjustment when in mesh. If they are not accurately or not rigidly mounted, the tooth bearing may be thrown entirely to one end of the teeth. This will impair their running qualities and may cause breakage under any extra load, such as might be induced by suddenly applying the full load. In their lack of adjustment, they differ unfavorably from spiral bevel gears, whose mating side tooth surfaces can be cut on different radii, so that the tooth bearing can be concentrated at any point along the tooth surfaces, thereby permitting the gears to accommodate themselves to any inaccuracy in mounting or to displacements under operating loads.

The primary object of this invention is to provide a method by which the mating side tooth surfaces of straight tooth bevel gears may be cut to mismatch each other lengthwise and so be provided with a tooth bearing which extends along a portion of the length of the teeth only, disappearing toward the ends. The present invention, hence, provides a new form of straight tooth bevel gears, which can be more readily assembled, than bevel gears as heretofore cut, and which are more dependable, especially when not rigidly mounted.

Heretofore, straight tooth bevel gears have been generated by rolling the tool and blank relatively to each other as though the blank were rolling on a crown gear whose axis intersects the axis of the blank in its apex, the crown gear being represented, in part, by a reciprocating tool. The tooth sides of a pair of such bevel gears contact along a straight line which passes through the common apex of the pair and the tooth bearing extends along the whole length of the face.

With this invention, the side tooth surfaces of straight tooth bevel gears are produced by rolling the tool or tools and blank relatively to each other as though the blank were rolling with a crown gear or a basic gear, represented by the tool or tools, whose axis intersects the axis of the blank in a point offset from its apex.

While the present invention is particularly applicable to the production of straight tooth bevel gears, the underlying principles thereof may be applied to the production of other types of gears also, especially of straight tooth gears.

In the accompanying drawings, I have illustrated a preferred method of practicing this invention. It will be understood, however, that the invention is capable of further modification within its scope and the limits of the appended claims.

In the drawings:

Figures 1 and 2 are a diagrammatic plan view and side elevation respectively, showing the method of producing one member of a pair of straight tooth bevel gears according to this invention;

Figures 3 and 4 are similar diagrammatic views showing the manner of producing the other member of the pair;

Figure 5 is a diagrammatic view of a pair of bevel gears, produced according to this invention, separated or disassembled;

Figure 6 is a diagrammatic view showing the pair of Figure 5 in assembly or mesh;

Figure 7 is a diagrammatic plan view of a bevel gear produced according to this invention and illustrating the principles which govern the cutting of the two members of a pair; and Figure 8 is a side elevation of a gear tooth of a bevel gear produced according to this invention, showing how the tooth bearing may be localized by this invention.

Heretofore, as previously stated, straight tooth bevel gears have been generated by rolling the tool or tools and the gear blank relatively to each other in the manner of a gear meshing with a basic gear whose axis intersects the axis of the blank in its apex. With the present invention, the axis of the basic gear is offset from the apex of the blank, intersecting the blank axis but in a point outside the blank apex.

Figures 1 to 4 inclusive illustrate the preferred manner of producing a straight tooth bevel pair according to this invention. Preferably, the generating operations will be effected upon a two tool planing machine. The tooth surfaces of one member 10 of the pair are produced by reciprocating a pair of planing tools 11 and 12 across the face of the blank 10 while simultaneously rolling the tools and blank relatively to each other, as though the blank were rolling on a basic gear, indicated in dotted lines at 16, whose axis 17 intersects the axis 14 of the blank in a point 13 which lies outside the blank apex 15. The tools represent a tooth of this basic gear and move in paths which converge in the point 18 which is the center or apex of this basic gear. The tooth surfaces of the blank are thus generated conjugate to the basic gear 16. The generating or rolling movement may be applied entirely to the tools, entirely to the blank, or in part to the blank and in part to the tools, in a manner analogous to conventional methods. Preferably, it will be produced by rotation of the blank on its axis and a simultaneous relative movement between the tools and blank about the axis 17. In this generating motion, the blank and basic gear will preferably be turned, relatively to each other about their respective axes at such a ratio that the line 20 connecting the mean point 19 of a tooth surface of the gear 10 with the intersection point 13 between the blank and basic gear axes, is the instantaneous axis of relative motion between the blank and basic gear. In other words, the tools and blank are preferably rolled together in the manner of a cone of an angle $90°-dp$ rolling on a cone whose cone angle is $p+dp$, line 20 being the contact line between the two cones.

After one tooth of the blank has been cut in this way, the tools and blank are withdrawn relatively to each other and the blank indexed. The operation then proceeds as before.

The teeth of the mating gear 22 are cut in a similar fashion, the tools 23 and 24 and blank 22 being rolled relatively to each other in the manner of a gear meshing with a basic gear 28 whose axis 29 intersects the blank axis 26 in a point 25 offset from the blank apex 27 and the tools being reciprocated across the face of the blank in paths converging in the center or apex 25' of the basic gear 28. Preferably, as with the mate gear, the blank 22 and the basic gear 28 are turned, relatively, about their respective axes 26 and 29 at such a ratio that the line 30 connecting the mean point 31 of a tooth surface of the gear with the point 25 of intersection of the blank and basic gear axes, is the instantaneous axis of relative motion between the blank and basic gear.

To obtain the desired mismatch between the mating side tooth surfaces of a pair produced according to this invention, the gears 10 and 22, respectively, are rolled on basic gears, whose axes 17 and 29, respectively, are offset different distances from the blank apexes 15 and 27 respectively.

Bevel gears mesh with apexes coinciding. Bevel gears provided with straight radial teeth as produced according to hitherto known methods have tooth sides composed of straight lines which converge in their apexes. Bevel gears produced according to the present invention also contain tooth surfaces composed of straight lines, but these lines converge approximately in the points 13 and 25, respectively, which are offset different distances from the apexes 15 and 27 of the respective gears and which do not coincide when the gears are in mesh. In assembly, the apexes 15 and 27 of the two gears 10 and 22 will, of course, coincide. But the straight lines of the mating tooth surfaces will never coincide, but will always remain at an angle to each other, as shown in Figure 6. Consequently, the tooth contact will not extend along the whole length of the straight line elements of the tooth surfaces of the two gears, but, mathematically speaking, will be confined to a point 35, which is the crossing point of the mating straight line elements 20 and 30, and in this case, the point of coincidence of the contact points 19 and 31. Actually, the length of the tooth bearing will be restricted or modified to an extent which depends principally upon the angle of the mating straight tooth lines, that is upon the location of the points 13 and 25, respectively, which are the points of intersection of the respective crown gear axes with the respective gear axes.

By the present invention, any desirable lengthwise modification or mismatch of the mating side tooth surfaces of a straight tooth bevel gear pair may be effected and a tooth bearing obtained, of any desired size and extent, such, for instance, as indicated on the tooth 36, Figure 8, by the shadowed area 37.

While gears produced according to the present invention mesh theoretically with point contact, it has been found, that nonetheless they transmit true uniform motion.

The desired lengthwise modification or mismatch of the mating side tooth surfaces can be varied by varying the relationship between the basic gears, from which the pair are to be generated. The way of determining this relationship will now be determined, in other words, how to place the axis 17 of a generating gear relative to the blank 10 to be produced, where the axis of the other generating gear is at 29.

If, the axis 17 of the generating gear intersects the axis 14 of the gear blank at 13, instead of in its apex 15, then the instantaneous axis between the blank and generating gear will be a line passing through the intersection point 13, whose angle $(p+dp)$ with the axis 14 of the blank depends on the ratio of roll. The latter is so chosen, preferably, that the instantaneous axis, during generation, passes through the mean pitch point 19 of the gear teeth. The ratio of roll is then equal to the ratio of the distances of the point 19 from the respective axes 17 and 14, that is equal to $$\frac{\cos dp}{\sin(p+dp)},$$

whether $dp$ be plus or minus.

A roll of one degree of the generating gear corresponds, therefore, to a roll of $$\frac{\cos dp}{\sin(p+dp)}°$$

of the blank.

To avoid bias bearing, that is, a tooth bearing extending obliquely across the surface of the teeth, the pressure angles of the mating tooth surfaces should be equal along the pitch line 38.

By investigating the pressure angles at different points in the pitch line 38, we can determine the required relationship between the generating gear axes 17 and 29 to obtain matching pressure angles along the pitch line 38. In this respect, it is necessary, first of all, to determine the contact which takes place between the pitch lines of each gear and its basic generating gear. The contact between the pitch lines of each gear and its basic generating gear takes place along some line, which for one side of the teeth projects into the pitch plane, that is the drawing plane of Figure 7, in a line 39, and for the other side of the teeth into the line 40. These lines are the loci of the points of intersection with the pitch plane of the normals to the side surfaces of the gear and generating gear at points on the instantaneous axis 20. Point 31 is a mean pitch contact point between the gear 22 and its generating gear 28. It is also a mean pitch contact point between the mating gears and lies on the pitch line 38. 41 indicates another point lying on the pitch line 39 of the blank and its basic gear 28 and forming a point of contact between the gear 22 and its basic gear 28 at the moment of the finishing cut of the tools at this point. When the gear 22 is in mesh with its mate gear 10, the point 41 will mesh with the mate gear along the contact line 38 of the two pitch surfaces and not along the line 39. When the point 41 is a point of contact between the mate gears 10 and 22, therefore, it will have moved to a position 41' lying on the line 38. The pressure angle of the point 41 is equal to the pressure angle of the basic gear or of the tool employed to cut the gear 22. When the point 41 has moved to point 41' and becomes a point of contact between the mate gears, the pressure angle will have increased relative to the drawing plane by an angle determined by the distance between the points 31 and 41 and the angle through which the point 41 is turned to reach the position 41'. The pressure angle at the point 41' referred to the drawing plane, can be determined by the known methods of descriptive geometry. When the pressure angle is known, the data with reference to the location of the axis of the generating gear with which the mate gear 10 is to be rolled, can be readily determined, since the pressure angles of the teeth of mating gears must be equal at various points along the pitch line or line of contact 38.

I have reduced the solution which can be obtained by the methods of descriptive geometry to certain equations, which I give briefly below. For the purpose of these solutions, the point 41 is assumed in the close vicinity of the point 31, so that infinitesimal considerations can be applied. The line of contact 39 between the pitch lines of the blank 42 and its basic gear 28 is inclined to the pitch line 38, or line of contact between the mate gears 10 and 22, by an angle $e$. Assuming the point 41' to be at a distance $s$ from the point 31, then the distance $41-41'=s\times\tan e$. The tooth normal at the point 41 is inclined to the drawing plane of Figure 7, by the pressure angle $a$ of the gear tooth, and intersects the instantaneous axis between the gear 22 and its basic gear 28. The instantaneous axis passes beneath the point 41' by a distance $s\times\tan dp$. From these considerations, it follows:

$$s\tan e \tan a = s \tan dp$$

and $$\tan e = \frac{\tan dp}{\tan a}.$$

As previously stated, the point 41 becomes a point of contact between the mating gears 10 and 22 when it has moved to the position 41'. At 41 the pressure angle $a$ is equal to the pressure angle of the basic gear. When 41 has been turned to 41', about the axis of the blank by an angle $$\frac{s\tan e}{A\sin p},$$

where $A$ is equal to the distance between the mean pitch contact point 31 and the gear apex 27, the inclination angle of the tooth normal to the drawing plane of Figure 7 is changed by $$\frac{s\tan e}{A\tan p}$$

and is therefore increased, or decreased, respectively, over the amount $a$ by this amount. Whence:

$$\frac{s}{A}\frac{\tan e}{\tan p}=\frac{s}{A}\frac{\tan dp}{\tan a \tan p}.$$

In a pair of mating gears, the pressure angles of the mating teeth should be equal at equal distances $s$. Hence:

$$\frac{s}{A}\frac{\tan dp}{\tan a \tan p} = \frac{s}{A}\frac{\tan dp'}{\tan a \tan p'},$$

where $dp'$ and $p'$ designate corresponding angles of the mate gear 10.

Solving this, we obtain:

$$\frac{\tan dp}{\tan p} = \frac{\tan dp'}{\tan p'}.$$

This equation enables one to determine $dp'$ and consequently the location of the axis 17, when $dp$ or the location of the axis 29 has been assumed.

Gears fulfilling this equation will have matching pressure angles all along their pitch lines and will therefore be free from bias.

While the axes 17 and 29 are shown parallel in Figures 5 and 6 and perpendicular to the pitch lines 38 of the gears 10 and 22, corresponding to the relative location of the respective gears and their crown gears, when the basic gears represent true crown gears, the present invention is not restricted to the production of straight tooth gears in a generating operation in which the tools represent tooth surfaces of a true crown gear. The principles underlying this invention as well as the general procedure followed in practicing this invention are broadly applicable to the production of bevel gears in a rolling process and may be applied to their production in any generating method as, for instance, where the blank is set to its root angle and the tools represent tooth surfaces of a nominal crown gear whose pitch angle is less than 90°.

Preferably, the tools employed in producing gears according to this invention will have side cutting edges which are straight, as shown. However, the cutting tools may be curved sided if desired.

The present invention may be practised upon known types of machines, simply by withdrawing or advancing the tool in the direction of the axis of the generating gears, the axis of the cradle, and advancing or withdrawing the blank axially in correspondence to Figures 2 and 4. The two tools will be so positioned as to converge toward the new axis 17 or 29, as the case may be, of the generating gear. In this way, the modified gears may be produced without extra cost or labor.

While I have described my invention in connection with a particular embodiment, it is to be understood that the invention is capable of various further modifications, and uses within its limits and the scope of the following claims, and that this application is intended to cover any adaptations, uses, or embodiments, following, in general, the principles of this invention and including such departures from the present disclosure as come within known or customary practise in the gear art and may be applied to the essential features hereinbefore set forth and as fall within the scope of the invention or the limits of the appended claims.

Having thus described my invention, what I claim is:

1. The method of producing a bevel gear, which consists in cutting its side tooth surfaces by moving a tool in a straight path across the face of the blank while imparting a relative rolling motion between the tool and blank as of a gear rolling with a crown gear whose axis is offset from the blank apex.

2. The method of producing a bevel gear, which consists in cutting its side tooth surfaces by moving a tool in a straight path across the face of a tapered gear blank while imparting a relative rolling motion between the tool and blank as of a gear rolling with a crown gear whose axis intersects the blank axis in a point offset from the blank apex.

3. The method of producing a bevel gear, which consists in cutting its side tooth surfaces by moving a tool in a straight path across the face of a tapered gear blank, while rotating the blank on its axis and simultaneously moving the tool and blank relatively to each other about an axis offset from the blank apex.

4. The method of producing a bevel gear which consists in cutting its side tooth surfaces by moving a tool in a straight path across the face of a tapered gear blank while rotating the blank on its axis and simultaneously moving the tool and blank relatively to each other about an axis which intersects the axis of the blank in a point offset from the blank apex.

5. The method of producing a straight tooth tapered gear which consists in reciprocating a pair of planing tools in converging paths across the face of a tapered gear blank, while imparting a relative rolling movement between the tools and blank as of a gear rolling with a basic gear whose axis intersects the blank axis in a point offset from its apex.

6. The method of producing a straight tooth tapered gear which consists in reciprocating a pair of planing tools in converging paths across the face of a tapered gear blank while rotating the blank on its axis and simultaneously moving the tool and blank relatively to each other about an axis intersecting the blank axis in a point offset from its apex.

7. The method of producing a straight tooth tapered gear which consists in cutting its side tooth surfaces by reciprocating a pair of planing tools in converging paths across the face of a tapered gear blank while rotating the blank on its axis and simultaneously producing a relative movement between the tool and blank about an axis passing through the point of convergence to the tool paths and intersecting the blank axis in a point offset from its apex.

8. The method of producing a tapered gear which consists in cutting its side tooth surfaces by moving a tool across the face of a tapered gear blank while imparting a relative rolling movement between the tool and blank as of two cones rolling together whose apexes coincide in a point which lies outside of the apex of the blank.

9. The method of producing a tapered gear which consists in cutting its side tooth surfaces by moving a tool in a straight path across the face of a tapered gear blank while imparting a relative rolling movement between the tool and blank as of two cones rolling together whose apexes coincide in a point which lies on the blank axis and outside of the apex of the blank.

10. The method of producing a pair of bevel gears, which consists in cutting the side tooth surfaces of one member of the pair by moving a tool across the face of a tapered gear blank while imparting a relative rolling movement between the tool and blank as of two cones rolling together whose apexes coincide in a point which is offset from the apex of the blank, and in cutting the side tooth surfaces of the other member of the pair by moving a tool across the face of a tapered gear blank while imparting a relative rolling movement between said tool and blank as of two cones rolling together whose apexes coincide in a point which is offset from the apex of the blank by an amount greater than the offset between the cone apexes and the blank apex in the cutting of the first member of the pair.

11. The method of producing a pair of tapered gears, which consists in cutting the side tooth surfaces of one member of the pair by moving a tool in a straight path across the face of a tapered gear blank while imparting a relative rolling movement between the tool and blank as of two cones rolling together whose apexes coincide in a point which lies on the blank axis and is offset from the blank apex, and in cutting the side tooth surfaces of the other member of the pair by moving a tool across the face of a tapered gear blank while imparting a relative rolling movement between the tool and blank as of two cones rolling together whose apexes coincide in a point which lies on the axis of the blank and is offset from the apex of the blank by an amount different from the offset between the cone apexes and the blank apex in the cutting of the first member of the pair.

12. The method of cutting a pair of bevel gears which consists in cutting the side tooth surfaces of one member of the pair by moving a tool in a straight path across the face of a tapered gear blank while imparting a relative rolling movement between the tool and blank, and in cutting the side tooth surfaces of the other member of the pair by moving a tool in a straight path across the face of a tapered gear blank, while rotating the blank on its axis and simultaneously producing an additional relative movement between the second tool and blank about an axis which intersects the blank axis in a point offset from the blank apex.

13. The method of cutting a pair of bevel gears which consists in cutting the side tooth surfaces of one member of the pair by moving a tool across the face of a tapered gear blank while producing a relative rolling movement between tool and blank in the manner of a gear rolling with a basic gear whose axis is offset from the blank apex, and in cutting the side tooth surfaces of the other member of the pair by moving a tool across the face of a tapered gear blank while imparting a relative rolling movement between the second tool and gear blank in the manner of a gear rolling with a basic gear whose axis is offset from the blank apex by an amount greater than the offset of the blank apex from the axis of the basic gear in cutting the first member of the pair.

14. The method of cutting a pair of bevel gears, which consists in cutting the side tooth surfaces of one member of the pair by moving a tool in a straight path across the face of a tapered gear blank while imparting a relative rolling motion between the tool and blank in the manner of a gear rolling with a basic crown gear whose axis intersects the blank axis in a point offset from the blank apex, and in cutting the side tooth surfaces of the other member of the pair by moving a tool in a straight path across the face of a tapered gear blank, while imparting a relative rolling movement between the second tool and blank in the manner of a gear rolling with a basic crown gear whose axis intersects the blank axis in a point offset from the blank apex by an amount different from the offset between the blank apex and crown gear axis in cutting the first member of the pair.

15. The method of cutting a pair of bevel gears, which consists in cutting the side tooth surfaces of one member of the pair by moving a tool in a straight path across the face of a tapered gear blank while rotating the blank on its axis and simultaneously moving the tool and blank relatively to each other about an axis offset from the blank apex, and in cutting the side tooth surfaces of the other member of the pair by moving a tool in a straight path across the face of a tapered gear blank, while rotating the blank on its axis and simultaneously moving the tool and blank relatively to each other about an axis offset from the blank apex by a greater distance than the corresponding offset in cutting the first member of the pair.

16. The method of cutting a pair of bevel gears, which consists in cutting the side tooth surfaces of one member of the pair by moving a tool in a straight path across the face of a tapered gear blank while rotating the blank on its axis and simultaneously moving the tool and blank relatively to each other about an axis intersecting the blank axis in a point offset from the blank apex, and in cutting the side tooth surfaces of the other member of the pair by moving a tool in a straight path across the face of a tapered gear blank, while rotating the blank on its axis and simultaneously moving the second tool and blank relatively to each other about an axis intersecting the blank axis in a point which is offset from the blank apex by a greater distance than the corresponding offset in cutting the first member of the pair.

17. The method of cutting a pair of bevel gears which consists in cutting the side tooth surfaces of one member of the pair by moving a pair of tools in converging paths across the face of a tapered gear blank while imparting a relative rolling movement between the tools and blank corresponding to that of a gear rolling with a crown gear whose axis passes through the point of convergence of the tool paths and intersects the blank axis in a point which is offset from the blank apex and in cutting the side tooth surfaces of the other member of the pair, by moving a pair of tools in converging paths across the face of a tapered gear blank while imparting a relative rolling motion between the tools and blank corresponding to that of a gear rolling with a crown gear whose axis passes through the point of convergence of the tool paths and intersects the blank axis in a point which is offset from the blank apex a different amount than is the corresponding point from the blank apex in cutting the first member of the pair.

18. The method of producing a pair of bevel gears, which consists in cutting the side tooth surfaces of one member of the pair by moving a pair of tools across the face of a tapered gear blank in paths converging in a point lying on the blank axis and offset from the blank apex, while rotating the blank on its axis and simultaneously producing an additional relative movement between the tool and blank about an axis passing through said point, and in cutting the side tooth surfaces of the other member of the pair by moving a pair of tools across the face of a tapered gear blank in paths converging in a point lying on the blank axis and offset from the blank apex a distance greater than the offset between the corresponding point and blank apex in cutting the first member of the pair, while rotating the blank on its axis and simultaneously imparting an additional relative movement between the tool and blank about an axis passing through the point of convergence of the tool paths.

19. The method of producing a bevel gear which consists in cutting its side tooth surfaces by moving a tool in a straight path across the face of a tapered gear blank while rotating the blank on its axis and simultaneously moving the tool and blank relatively to each other about an axis offset from the blank apex and intersecting the tool path.

20. The method of producing a bevel gear which consists in cutting its side tooth surfaces by moving a tool in a straight path across the face of a tapered gear blank while rotating the blank on its axis and simultaneously moving the tool and blank relatively to each other about an axis intersecting the blank axis in a point offset from the blank apex and intersecting the tool path.

21. The method of producing a bevel gear which consists in cutting its side tooth surfaces by moving a tool in a straight path across the face of a tapered gear blank while simultaneously producing a relative rolling movement between the tool and blank as of a gear rolling with a basic gear whose axis is offset from the blank apex and intersects the tool path.

22. The method of producing a bevel gear which consists in cutting its side tooth surfaces by moving a tool in a straight path across the face of a tapered gear blank while simultaneously producing a relative rolling movement between the tool and blank as of a gear rolling with a basic gear whose axis intersects the blank axis in a point offset from the blank apex and whose axis also intersects the tool path.

23. The method of producing a bevel gear which consists in reciprocating a pair of tools in converging paths across the face of a tapered gear blank while simultaneously producing a relative rolling movement between the tools and blank as of a gear rolling with a basic gear whose axis is offset from the blank apex.

24. The method of producing a bevel gear which consists in reciprocating a pair of tools in converging paths across the face of a tapered gear blank while simultaneously producing a relative rolling movement between the tools and blank in the manner of a gear meshing with a basic gear whose apex is the point of convergence of the tool paths and whose axis is offset from the blank apex.

25. The method of producing a bevel gear which consists in cutting its side tooth surfaces by moving a pair of tools in straight converging paths across the face of a tapered gear blank while simultaneously producing a relative rolling movement between the tools and blank in the manner of a gear meshing with a basic gear whose axis intersects the axis of the blank in a point offset from the blank apex and whose apex is the point of convergence of the tool paths.

ERNEST WILDHABER.